United States Patent [19]

Brozovich et al.

[11] Patent Number: 5,311,569
[45] Date of Patent: May 10, 1994

[54] LINE-BASED PUBLIC SAFETY ANSWERING POINT

[75] Inventors: Joseph M. Brozovich, Woodridge; Nicholas M. DeVito, Naperville; Douglas C. Kroupa, Lisle; Paul E. Renn, Downers Grove; Paul M. Simek, Lisle; David A. Snyder, Naperville; James L. Turner, Lemont, all of Ill.

[73] Assignee: AT&T Bell Laboratories, Murray Hill, N.J.

[21] Appl. No.: 893,613

[22] Filed: Jun. 5, 1992

[51] Int. Cl.$^5$ .............. H04M 11/04; H04M 11/00; H04M 3/42
[52] U.S. Cl. ....................... 379/45; 379/37; 379/49; 379/94; 379/201
[58] Field of Search .............. 379/45, 49, 96, 142, 379/201, 207, 265, 266, 211, 127, 37, 94

[56] References Cited

U.S. PATENT DOCUMENTS

| | | | |
|---|---|---|---|
| 3,881,060 | 4/1975 | Connell et al. | 179/5.5 |
| 4,769,834 | 9/1988 | Billinger et al. | 379/207 |
| 4,860,342 | 8/1989 | Danner | 379/96 |
| 4,893,325 | 1/1990 | Pankonen et al. | 379/45 |
| 4,942,598 | 7/1990 | Davis | 379/142 |
| 5,008,930 | 4/1991 | Gawrys et al. | 379/211 |
| 5,033,076 | 7/1991 | Jones et al. | 379/45 |
| 5,077,788 | 12/1991 | Cook et al. | 379/142 |
| 5,109,399 | 4/1992 | Thompson | 379/45 |

FOREIGN PATENT DOCUMENTS

91/07688 10/1991 PCT Int'l Appl. .

OTHER PUBLICATIONS

The article, "E911 Public Safety Answering Point: Interface Between a 1/1AESS TM Switch and Customer Premises Equipment", pp. 2–12, Nov. 1987.

Primary Examiner—Curtis Kuntz
Assistant Examiner—Jason Chan
Attorney, Agent, or Firm—Michael B. Johannesen

[57] ABSTRACT

A line-based 911 system and method that completes an emergency call from a telephone to a PSAP comprising a multiplicity of operator stations connected by individual lines to a telephone switching system. An emergency call is routed to the termination ports of the switching system associated with a PSAP. Each of the termination ports is connected to one of the multiplicity of operator stations via its associated line, thereby establishing a path from the telephone to the operator station, the CPN of the calling telephone is delivered to the selected operator station and the operator station obtains location information of the telephone in accordance with the CPN, which is then displayed.

17 Claims, 6 Drawing Sheets

```
                    ISDN PSAP, Position #1
```

|  |  |
|---|---|
| (708)555-0008  11:39  04/09<br>Tom Smith<br>AT&T NSC Complex<br>2600 Warrenville Rd.<br>Lisle IL 60532<br>0 BUSN<br><br>Room 51-F23<br>Lisle Police<br>Lisle Fire Stn. No. 2<br>Lisle Ambulance Inc.<br><br>Sign in with security | CALL STATUS<br>POS 1 ACTIVE<br>POS 2 IDLE<br>POS 3 IDLE<br>POS 4 IDLE<br>POS 5 IDLE<br>OVRFL IDLE<br><br>POSITION STATUS<br>ACTIVE<br><br>ALI STATUS<br>OPERATIONAL<br><br>ALARM STATUS<br>NO ALARM |

| F1<br>ANSWER<br>CALL | F2<br>CALL<br>FIRE | F3<br>CALL<br>POLICE | F4<br>CALL<br>MEDICAL | F5<br>CALL<br>COUNTY | F6<br>CALL<br>POISON | F7<br>CALL<br>TOXIC | F8<br>DROP<br>PARTY | F9<br>HOLD<br>CALL | F10<br>HANGUP<br>CALL |
|---|---|---|---|---|---|---|---|---|---|
| 1<br>BUSY<br>POS | 2<br>CLEAR<br>ALARM | 3<br>CHANGE<br>COLOR | 4<br>CLEAR<br>ALI | 5<br>SEND<br>ALI | 6<br>LOOKUP<br>ALI | 7<br>RECALL<br>ALI | 8<br>CALL<br>BACK | 9<br>UPDATE<br>SCREEN | 0<br>CALL<br>OTHER |

*FIG. 6*

LINE-BASED PUBLIC SAFETY ANSWERING POINT

TECHNICAL FIELD

This invention relates to emergency telephone services (911 services), and, more specifically, to a system for providing a line-based public safety answering point (PSAP).

BACKGROUND OF THE INVENTION

Increasing attention has been focused on emergency telephone services (911) in the past several years because, as more and larger communities are served by 911 service, certain limitations have received publicity. Initially, 911 systems relied on interaction between the caller and the operator at the PSAP to identify the location of the caller. Thus the operator could not obtain accurate location information if the caller were a child, were incapacitated, or hung up the telephone before the location was given.

More recently, certain location information of the originating telephone became available automatically as the call was being established. As the call is set up through the network, the automatic Number Identification (ANI) used for establishing long distance calls is delivered to the PSAP. A database query is then dispatched to obtain location information of the caller, based on the ANI of the telephone from which the call is originating. For most residential telephones, this is sufficient data to determine location. However, for businesses, such as large office complexes, this data is not sufficient to locate the office or area where the call is being made. The reason that some location information can be incomplete or misleading is that ANI is the billing number of the calling telephone, not the directory number of that telephone. It would be preferable to know the directory number of the calling party, but the telephone network cannot transmit the directory number of the calling party to existing PSAPs.

In order to understand this problem, it is helpful to understand the current state of the art of 911 systems. FIG. 1 is a block diagram of a prior art 911 system 100. 911 system 100 generally comprises a switching system 102 connected via a trunk group 104 to a public safety answering point (PSAP) 106. Switching system 102 is called the 911 tandem because it routes calls from a 911 service region 108 to the PSAP 106 serving that region and may comprise any type of switch that can route calls over trunks. 911 tandem 102 services individual lines such as 110 and 112, lines from other switches, such as line 114 connected to switch 116, and lines from other equipment, such as private branch exchanges 118 and 120. When switch 116 receives a 911 call from line 114, for example, switch 116 routes the 911 call to 911 tandem 102, passing the ANI. 911 tandem 102 then identifies which PSAP handles calls from that ANI, and translates the PSAP identification into a route index. 911 tandem 102 routes the call according to the route index over trunk group 104 to PSAP 106.

PSAP 106 includes trunk to line conversion hardware 122 to terminate trunk group 104 and convert the trunks into line appearances. Connected to trunk to line conversion hardware 122 is a key system 124 to provide connections between incoming 911 calls and operator positions 126-128 at PSAP 106. Key system 124 alerts every telephone attached to it, as is known in the art. An automatic number identification (ANI) converter 130 connected to trunk to line conversion hardware 122 receives the incoming ANI from the trunk and displays it to the operator. Trunk-to-line conversion hardware 122 uses the ANI to cause a query to be sent to an automatic location identification (ALI) system 132. ALI system 132 is a database which receives the incoming ANI directory number and provides name, address, type of service (business, residential, etc.), and other information (such as special needs or hazards) associated with the directory number. ALI system 132 is connected to the trunk termination equipment via a dedicated link 134.

When a 911 call is made from a residential telephone, such as telephone 110, 911 tandem office 102 routes the call to PSAP 106. The call is routed over trunk group 104, and the call set up protocol includes sending the ANI associated with telephone 110 to PSAP 106. In PSAP 106, the trunk to line conversion hardware 122 receives the call and alerts key system 124, which in turn alerts every operator position 126-128 in PSAP until one of the operators answers the call. The ANI of telephone 110 is displayed on converter 130, and the trunk-to-line conversion equipment 122 causes an ALI query to retrieve the location information for telephone 110. The operator may then initiate other calls to the appropriate public safety departments.

This system works relatively well for a call from a telephone located in a residence, but has several limitations for businesses with multiple telephones. As stated above, ANI is the billing directory number of the subscriber, and not necessarily the directory number (herein referred to as "calling party number" or "CPN") of any specific telephone, but is used primarily to provide an address for billing purposes. If the 911 call is from a telephone at a large business campus, it is likely to originate over a PBX, such as 120. The call is routed by PBX 120 over trunks 136 to switch 116, which in turn routes the call over trunks 138 to 911 tandem office 102. The ANI of the PBX trunk 136 is delivered to the 911 tandem office 102 as part of call set up. 911 tandem office 102 routes the call to PSAP 106, and as before, the call is presented to the operators and an ALI query is dispatched to ALI system 132. However, since the only telephone number that is received is the ANI, only the location of the billing number is displayed. The actual location of the telephone from which the 911 call originated is not generally available to the operator. This has proven in the past to cause delays in locating the person who made the call, sometimes with fatal consequences.

Some PBX systems (such as an AT&T Definity ® telecommunication system) can send the CPN of the calling telephone to the PSAP today, but only when there are specific connections to the network. These PBX systems send the CPN to the 911 tandem provided that the 911 tandem is a 5ESS ® switch and the PBX system is connected to the 5ESS ® switch by a primary rate interface (PRI) trunk. A PRI is a trunk group comprising a plurality of digital voice channels and a data channel. Special action is taken at the PBX to send the CPN in addition to the ANI to the 5ESS ® switch. The 5ESS ® switch then replaces the ANI with CPN, but only for 911 calls with this specific equipment.

In general, however, current 911 systems are limited in their ability to guide public safety offices to the exact location of an emergency, because of limitations inherent in 911 systems. Additionally, PSAP systems are limited as to what outgoing features may be used from the current key systems. Current 911 systems only permit speed calling, 3-way calling, and selective transfer (transferring the call to another 911 PSAP based on the location of the ANI). Finally, the equipment at these prior art PSAPs is very expensive for local governments to purchase, maintain, and install, because of the specialized nature of the equipment. 911 trunk to line conversion hardware is used only in PSAP systems, and the key system is used as operator services equipment.

Therefore, a problem in the art is that there is no 911 system that can provide CPN for both residences and businesses, provide a greater number of features, and be low in cost.

SUMMARY OF THE INVENTION

This problem is solved and a technical advance is achieved in the art by a line-based 911 system and method that provides CPN to the ALI system and is low in cost. By using standard ISDN telephones and standard personal computers, an inexpensive PSAP is assembled, which, among other things, takes advantage of the incoming line identification capability (herein calling party number or CPN) made available by the switching system to which the ISDN telephone is connected.

Routing equipment routes the emergency call to the termination ports of the switching system associated with a PSAP. A direct connection links each of the termination ports to one of the multiplicity of operator stations via its associated line, whereby a path is established from the telephone to the operator station. Advantageously, since the system delivers the CPN of the calling telephone to the selected operator station via the associated line, the operator station is able to obtain location information of the telephone in accordance with its CPN. Finally, the operator station displays the location information of the telephone.

The method according to this invention provides emergency telephone service by routing the emergency call based on the CPN of the calling telephone to a selected switching system connected to the PSAP, transmitting the CPN of the telephone to the selected operator station and delivering the CPN of the calling telephone to the operator station over the line connecting the operator station and the selected switching system. The method also includes displaying the CPN at the operator station, retrieving the location information associated with the telephone based on the delivered CPN and displaying the location information at the operator station. Advantageously, a voice path may then be connected from the calling telephone to the operator station.

BRIEF DESCRIPTION OF THE DRAWING

FIG. 6 is an exemplary display at an operator position at the PSAP of FIG. 2, showing the CPN, location information, and available telephone features.

DETAILED DESCRIPTION

Figure 1:
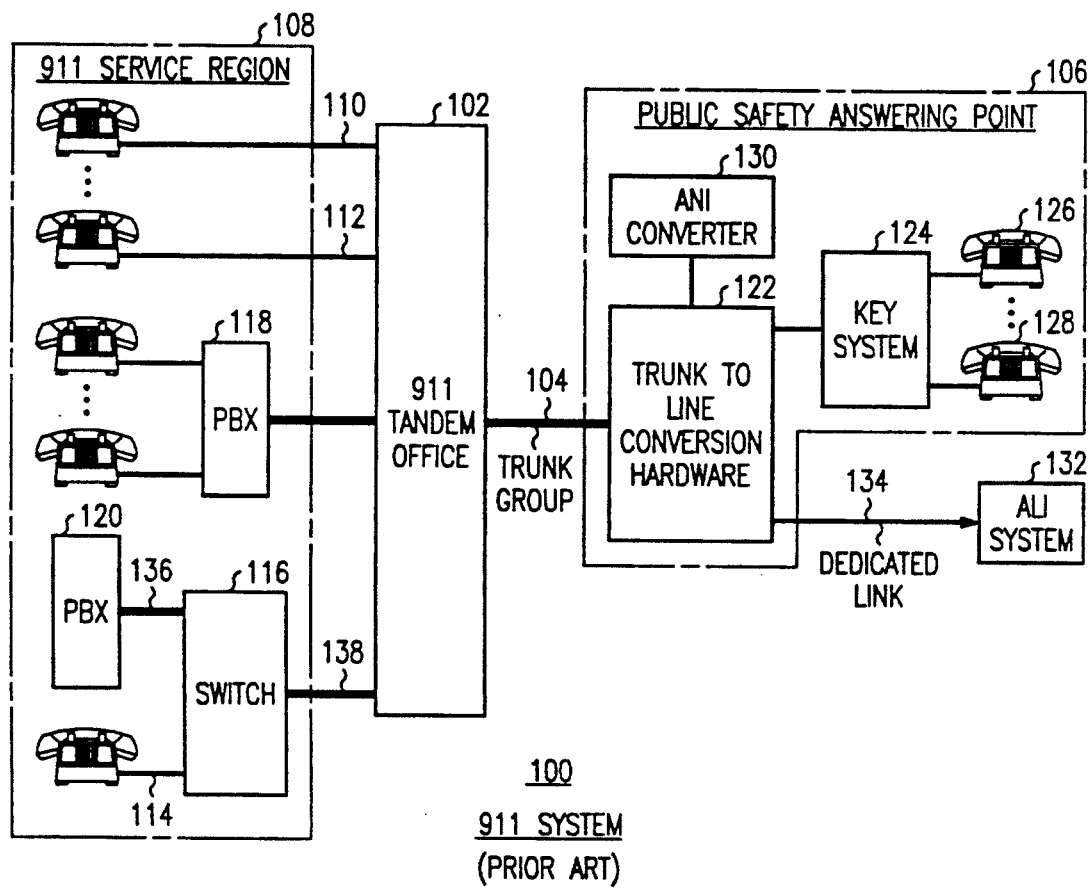
FIG. 1 is a block diagram of a prior art 911 system and its associated service region.
Figure 2:
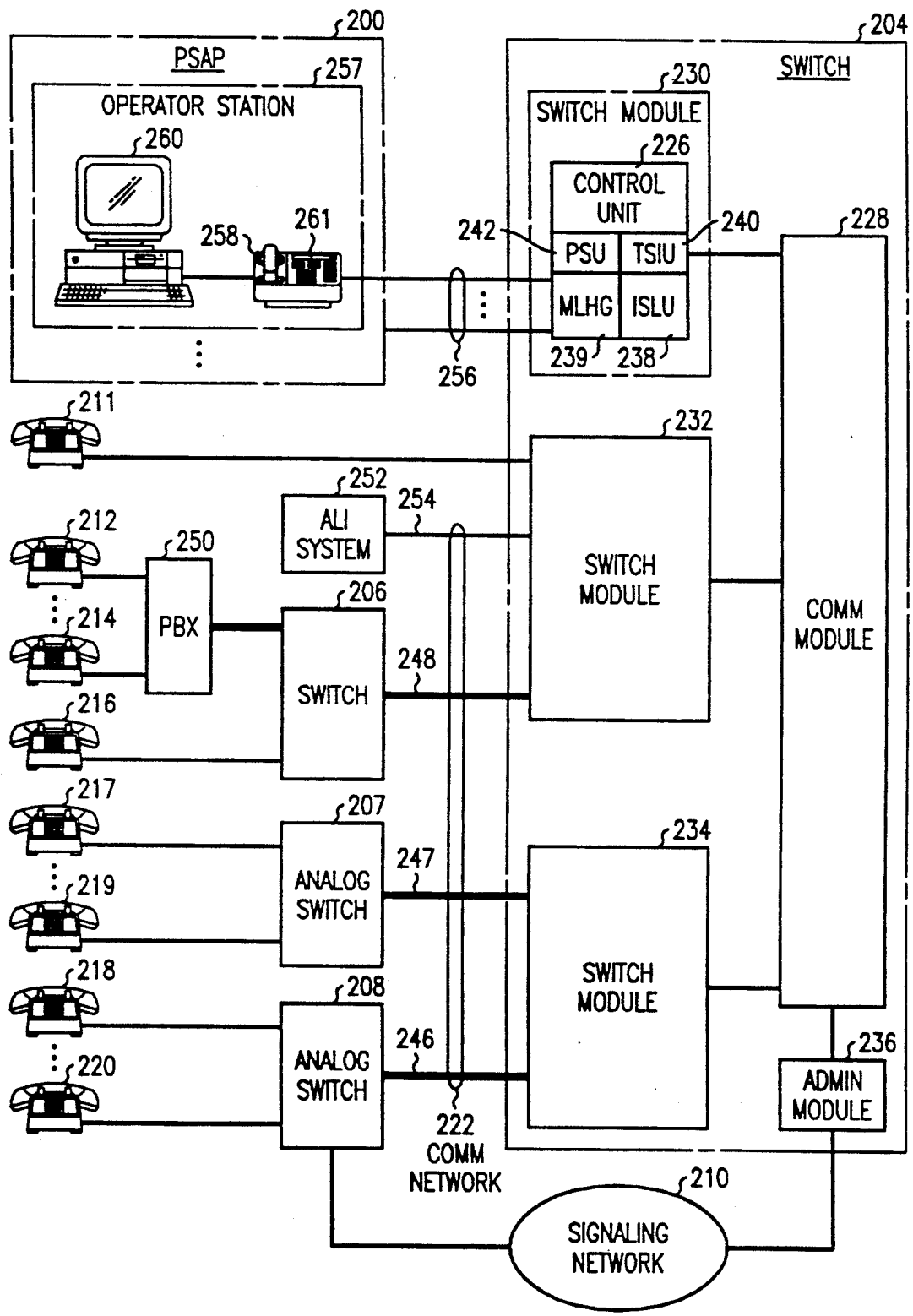
FIG. 2 is a block diagram of a switching network configuration including an exemplary embodiment of this invention.

This invention will be described in connection with a telephone switching system as illustrated in FIG. 2. An exemplary line-based public safety answering point (PSAP) 200 is described herein in the context of a telephone switching network configuration of FIG. 2, having four central office switches, 204, 206, 207, and 208, an inter-switch signaling network 210, e.g., a common channel signaling (i.e., CCS7) network and illustrative communications stations, including conventional analog telephone station sets 211-220. Switches 204, 206, 207, and 208 are interconnected by a communication network 222, which may include intermediate switches. Illustratively, switch 204 is a distributed control, ISDN electronic telephone switching system such as the system disclosed in U.S. Pat. No. 4,592,048, issued to M. W. Beckner, et al., on May 27, 1986.

An integrated services digital network (ISDN) is a network that provides end-to-end connectivity to support a wide range of services, including voice and non-voice services, to which users have access by a limited set of standard multipurpose customer interfaces. Switch 204 includes a number of switching modules (SM's), each associated with a different set of telephone station sets or trunks. Each switching module includes a control unit for controlling connections to and from its associated telephone station set or trunks. Switching module 230, for example, includes control unit 226 for controlling connections to and from PSAP 200.

The architecture of switch 204 includes communication module (CM) 228 as a hub with switching modules 230, 232, and 234, and an administrative module (AM) 236 emanating therefrom. Switching module 230 includes an integrated services line unit (ISLU) 238, which terminates the digital subscriber lines, and provides access to a time slot interchange unit (TSIU) 240 and a packet switching unit (PSU) 242. TSIU 240 and PSU 242, respectively, provide circuit and packet switched connections over digital subscriber lines under control of control unit 226. ISLU 238 further includes multi-line hunt group termination ports 239, as known in the art, terminating the multiplicity of lines between PSAP 200 and ISLU 238. Switching modules 232 and 234 include integrated services line units conventional analog line units, and analog or digital trunk units (not shown) for interfacing with the outgoing trunks included in communications network 222.

Communications module 228 includes a time-shared space-division switch or time-multiplexed switch (TMS) and provides a switch fabric for communication among switch modules and the administrative module 236. Administration module 236 provides coordination of the functional components of switch 204 and human-machine interface. Administration module 236 also provides a connection for switch 204 to signaling network 210.

Switch 208 is an analog switch (for purposes of explaining this invention), and is connected to switch 204 at SM 234 by one or more multi-frequency or CAMA/ANI trunk groups 246, as is known in the art. One or more telephones (such as 218-220) connected to analog switch 208 are served by the 911 system of this exemplary embodiment. Analog switch 208 is also connected to signaling network 210.

Switch 207 is an analog switch which, for purposes of explaining this illustrative embodiment, is not connected to signaling network 210. Switch 207 is connected to switch 204 at SM 234 by one or more multifrequency or CAMA/ANI trunk groups 247, as is known in the art. One or more telephones, illustrated by telephones 217-219, connected to analog switch 207 are served by the 911 system of this exemplary embodiment.

Switch 206 is a digital switch, such as a 5ESS® switch as described above, and is connected to switch 204 at SM 232 by PRI trunk group 248. Both lines 216 and PBX 250 are served by the 911 system of this exemplary embodiment. Also shown connected to SM 232 is ALI system 252 that services the 911 system of this exemplary embodiment. In this example, ALI 252 is connected via BRI 254, but could also be connected by trunk or dedicated link.

PSAP 200 according to the exemplary embodiment of this invention is connected to ISLU 238 of SM 230 by a multiplicity of basic rate interface (BRI) lines 256 at MLHG termination ports 239. Each BRI line comprises two B channels for voice communication and one D channel for data communication. In this exemplary embodiment, PSAP 200 comprises a multiplicity of operator stations 257 comprising ISDN telephone station sets 258 terminating BRIs 256 and connected to personal computers (PC) 260. There is a one-to-one correspondence among the operator stations, lines and termination ports at MLHG 239. Only one operator station comprising telephone 258 and PC 260 is shown in FIG. 2 for clarity. Telephone 258 comprises an AT&T ISDN 7506 or 7507, as is commercially available, with AT&T feature package three to allow control of telephone 258 from PC 260. Telephone 258 includes an LCD display 261 which displays the incoming CPN according to this embodiment of this invention.

PC 260 comprises an AT&T PC 6386SX/EL20 WGS in the preferred embodiment, with 4 megabytes of main memory and one 3.5 inch disk drive. No hard disk drive is necessary in this embodiment, but a hard disk drive could be optionally added to maintain special databases, record performance data and the like. Once the system is operational, the operator using a headset can perform all functions from the keyboard of PC 260 without touching telephone 258. If, however, PC 260 is not functional or operational, the telephone 258 can still function to provide most of the functions of the PC.

In this exemplary embodiment, PSAP 200 can receive the CPN of almost all of the telephones within the PSAP service region. All prior art PSAPs were MF or CAMA/ANI trunk based systems, which can only deliver ANI. In this embodiment of this invention, an ISDN network which includes switches such as switch 204, and switch 206, delivers CPN routinely, along with other call setup information. For systems such as analog switch 208, analog switch 208 is connected to signaling network 210, whereby CPN may be delivered either as part of call setup or as a special request from switch 204 through signaling network 210.

In an exemplary 911 call, the user of the telephone 216 enters 911. Switch 206 translates this call to a route index for switch 204, and routes the call according to standard call processing procedures. Switch 206 selects a trunk to switch 204 and initiates a call setup, which includes sending CPN. Switch 206 receives the call at SM 232 and routes the call through CM 228 to SM 230. Control unit 226 in SM 230 receives the call and determines that CPN is valid, as will be defined below. SM 230 then selects one of multi-line hunt group 239 based on its busy/idle status and connects the call through ISLU 238 over BRI line 256 to ISDN telephone 258, establishing a path. Alternatively, control unit 226 could implement a switch-based automatic call distribution system (ACD), in conjunction with MLHG 239 which would provide additional line selection features, usage counts, and line activity monitoring.

Telephone 258 receives a call setup message on the D channel of BRI 256 and informs PC 260. As part of the setup routine, ISDN telephone 258 receives the CPN and displays a representation of it on its internal display 261. This feature is referred to as incoming line identification capability. PC 260 also receives the CPN and initiates, in this exemplary embodiment, a data call to ALI system 252. In this embodiment, a data message is sent via the D-channel of BRI 256, but could alternatively be sent on one of the B-channels. SM 230 forwards the request to ALI system 252. There may be other switches between switch 230 and ALI system 252.

ALI system 252 returns the location information associated with the CPN, including data such as room number and/or building location of the calling telephone or other personal data (i.e., handicap, special directions, etc.). This data is returned to PSAP 200, which stores the information and displays a representation of this information on PC 260. A voice path is then completed on one of the B-channels of BRI 256. Additional calls may be made to other data systems using CPN or any of the previously retrieved data as a key.

Alternatively, if a 911 call originates at a telephone, such as telephone 217, where CPN is not available, the call is routed by switch 207 to SM 230 via analog MF or CAMA/ANI trunk 247. Only the ANI of the calling telephone is available in this example. Switch 204 completes the call to PSAP 200, as described above. However, control unit 226 in SM 230 determines that the CPN is not valid, meaning that the CPN is not a directory number, and delivers the ANI received over the connecting trunks as part of the call processing in place of CPN. Call processing proceeds then as above.

For purposes of this invention, only the line identification feature is required. However, all other ISDN functions, and all previously existing PSAP functions are available to the PSAP in the exemplary ISDN embodiment. In addition to speed calling, three-way calling and selective transfer, the ISDN PSAP of the present invention provides for six-way conferencing, number make busy, group make busy, queue level indicators, queue level lamps, and queuing of 911 calls with announcements. There could also be shared call appearances according to the preferred embodiment of this invention.

For example, when a call is routed to PSAP by control unit 226, and all termination ports in MLHG 239 are busy, control unit 226 can queue the call for a next available operator. Optionally, an announcement can be given to the calling party indicating that the call is queued. Additionally, a queue level indication, or number of queued calls, may be given at each operator station (or at a designated operator station) by control unit 226 sending a data message to each PC containing the information, and the PC altering its display accordingly.

Each operator station may have a key to request that control unit 226 regard the port connected to the operator station as busy. This may be used to provide the operator with a break or so that the operator may assist another operator. An indication of the busy status of each operator station (whether requested or connected to a call) or idle status may be displayed at each operator station (or a designated operator station) by control unit 226 sending a data message to each PC containing the information, and the PC altering its display accordingly.

PC 260 may store for a period of time the last N ALI records. The operator may then retrieve any of the stored records for further use, including calling the party back.

For the selective transfer feature, control unit 226 in SM 230 must replace the outbound calling party number with the calling party number of the telephone that originated the 911 call. If this were not performed, the CPN of the ISDN PSAP would be inserted in this field, which would be undesirable. In an ISDN-to-ISDN transfer, the CPN of the calling telephone is placed in the CPN field of the call setup message. In a transfer from an ISDN-based PSAP to a prior art PSAP, the CPN of the telephone that initiated the 911 call may be inserted in the place of ANI in the communication stream, thus providing appropriate calling party location information at the receiving PSAP.

Figure 3:
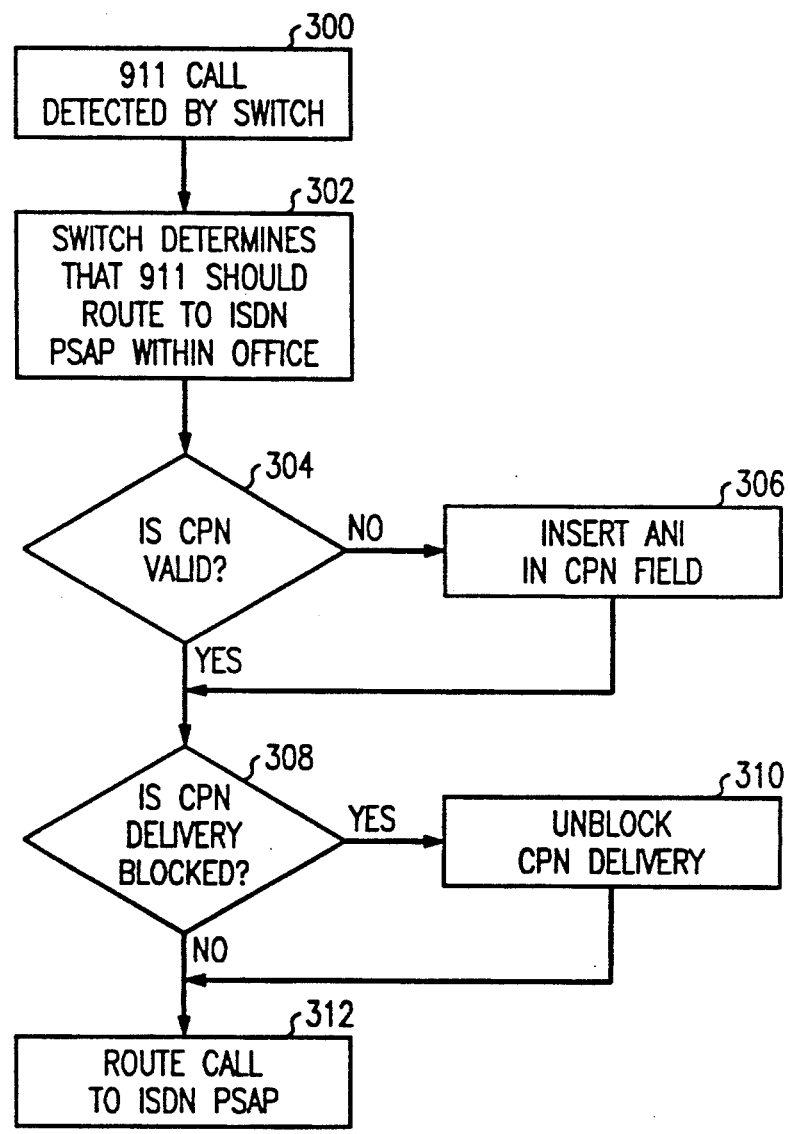
FIG. 3 is a flow chart illustrating the flow of control at the switching system of FIG. 2, in connection with routing the call to an operator position, according to an exemplary embodiment of this invention.

Turning now to FIG. 3, a flowchart describing the flow of control at control unit 226 of SM 230 is shown. Processing starts in box 300 where an incoming 911 call is detected by the switch. The call may be originating from a line attached to a line unit at the switch, or may be incoming from another switch, via a trunk. Processing continues in box 302 where the switch determines that the 911 call should be routed to a PSAP within the office.

Processing continues to decision diamond 304 where a determination is made whether the calling party number (CPN) is valid. CPN is valid if the incoming call were originating within the switch or, alternatively, were available from a remote switch via a PRI trunk or signaling network connection. If the CPN is not valid, then processing continues to box 306 where the incoming ANI is inserted in the CPN field in the message routed to the PSAP. Processing continues from both decision diamond 304 and box 306 to decision diamond 308 where a determination is made if the delivery of CPN is blocked. Delivery of CPN is blocked if a privacy bit is set in the incoming message. Normally, if the CPN privacy bit is set in a message, then the user of the calling telephone has activated the privacy capability, meaning that the user does not wish his or her phone number to be displayed on the destination phone where caller ID is available. If delivery of CPN is blocked in decision diamond 308, then processing continues to box 310 where delivery of CPN is unblocked, by clearing the privacy bit. Processing continues from both decision diamond 308 and box 310 to box 312. In box 312, the call is routed to an available ISDN PSAP operator positions.

Figure 4:
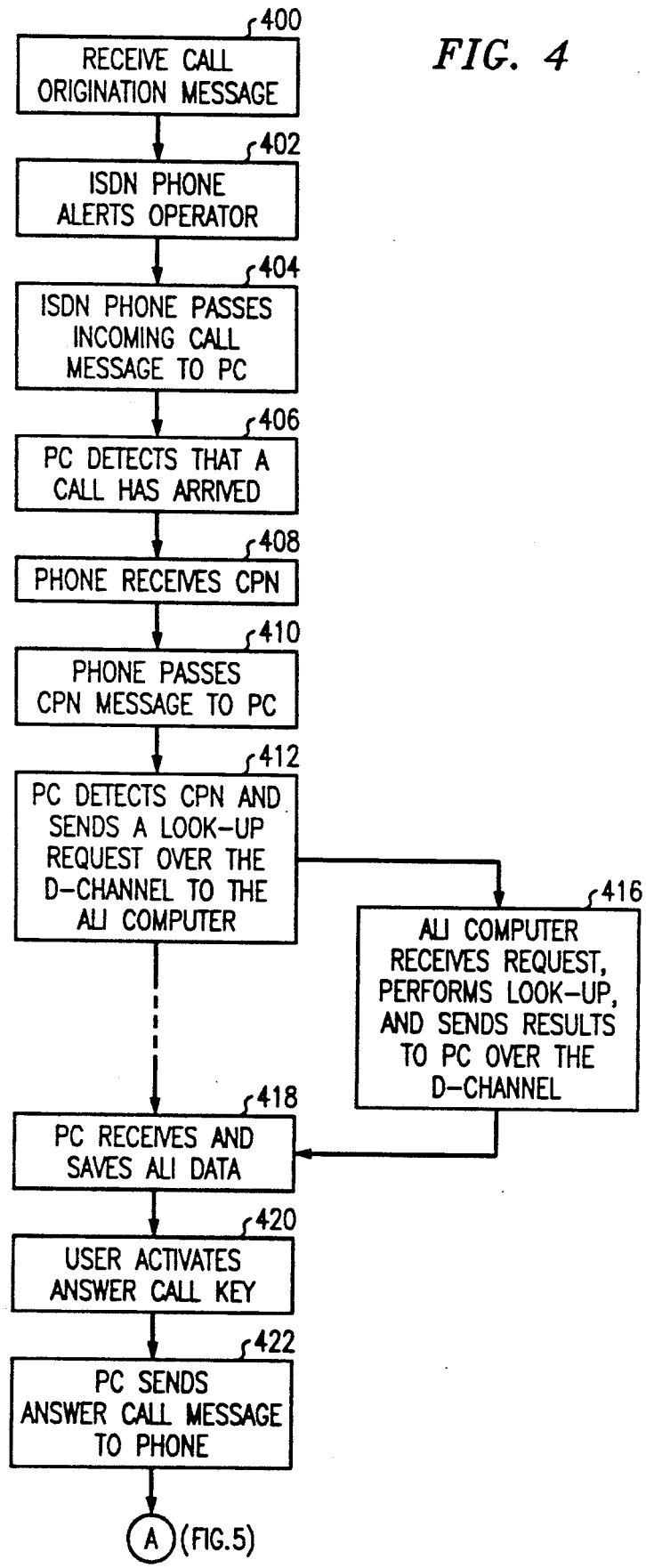
FIGS. 4 and 5 are flow charts illustrating the flow of control at the PSAP of FIG. 2 according to an exemplary embodiment of this invention.

Turning now to FIG. 4, a flowchart showing the flow of control at PSAP 200 is shown. Processing begins in box 400 where an origination message is received at the PSAP ISDN telephone set. In response to the origination message, processing continues to box 402 where the telephone alerts in response to the origination message. Processing continues to box 404 where the telephone passes the incoming call message to the PC. By receipt of this message in box 406, the PC detects that an incoming 911 call has arrived. Processing continues to box 408, where the telephone station set receives the calling party number and optionally displays it. Processing continues to box 410, where the telephone passes the CPN message to the PC. In response to receipt of the CPN message, in box 412 the PC causes the ISDN telephone to send a request over the D channel to the ALI computer, requesting ALI information for the respective CPN. Processing continues to box 416, where the ALI computer receives a lookup request, performs the lookup, and returns the results back to the PC over the D channel. Processing continues to box 418, where the PC receives the ALI data and stores it in memory. Processing proceeds to box 420 where the operator activates the answer call key. Processing continues to box 422 where the PC sends an "answer call" message to the telephone.

Figure 5:
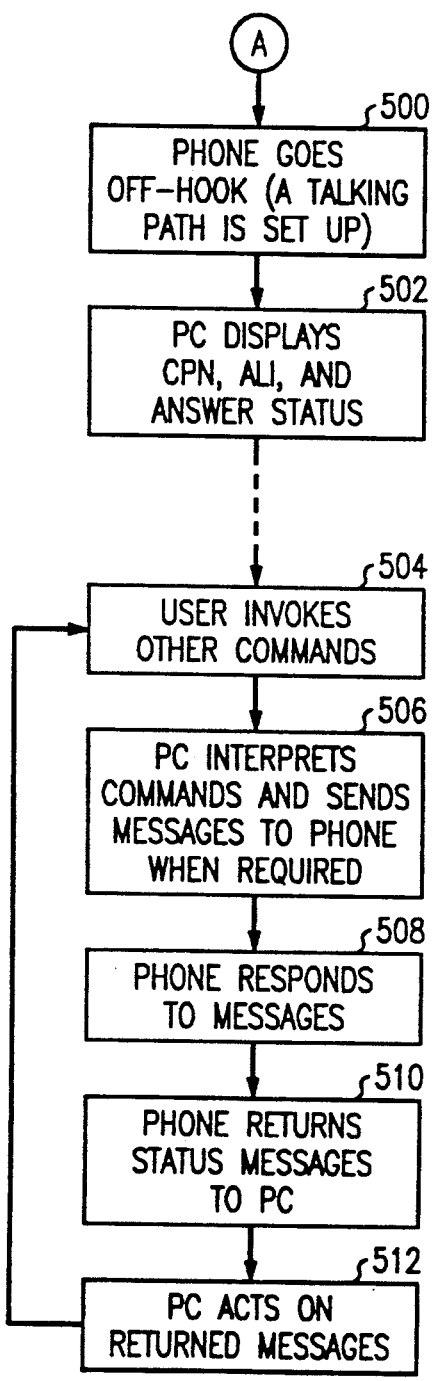

Processing proceeds through connector A to FIG. 5, where processing continues to box 500, where the telephone sends an offhook message, to set up a voice path between the operator and the caller. The PC displays in box 502 the calling party number (full 10 digits), the automatic location information, and the call status.

Processing continues at some later time, when, in box 504 the operator invokes commands (i.e., bridge call, call another PSAP, call the calling party back, etc.). In response to the operator commands, in box 506 the PC interprets the commands and sends messages to telephone when switching action is required. Processing continues to box 508 when the ISDN telephone responds to the messages by taking appropriate action. Processing continues to box 510 where the ISDN telephone returns status messages to the PC to update the PC screen. Processing continues to box 512 where the PC acts on the return message, updating the screen appropriately, and processing loops back to box 504 to await further commands. Processing continues in this manner until one side or the other gives an onhook signal.

Turning now to FIG. 6, a screen display is shown for the PC in this exemplary embodiment at the PSAP after the calling party and automatic location information is displayed. A full ten-digit phone number is displayed, thus giving PSAPs covering regions with more than one NPA a clear indication where the caller is located. The time of day and the month and date are also displayed. Next, the name associated with, and the address of the calling telephone, is displayed, along with a status type and a class of service. The status digit represents a type of service such as foreign exchange (FX) lines or party lines. The class of service is business, residential, commercial, etc. Next, if necessary, a room number associated with the telephone is displayed. Prior to this invention, displaying a room number in a large business location, such as the AT&T NSC complex, which has multiple buildings, was not possible without special hardware. The next lines give the name of the emergency service providers for the location. Finally, there is a plurality of lines remaining for notes, such as handicap, previous 911 calling record, hazards on site, special admittance procedures, or information from other databases.

Status indicators are presented along the right hand column of the screen, in the exemplary embodiment. First, a call status is given for the members of the multiline hunt group in this illustrative PSAP. In this example, position 1 is active and the rest of the positions are idle. Next, a position status is given for the specific position. In this case, position one is active. The next field gives the status of the ALI, which is operational. Finally, an alarm status is given as to the functionality of the connection to the ALI system.

There are two rows of key labels across the bottom of the screen. The top row is for the function keys, or F1 through F10 keys, of a standard PC keyboard. The PC is pre-programmed, as is known in the art, to perform a function associated with the label on the keyboard. Therefore, the F1 button is used to answer the call, F2 calls the fire department listed in the screen, etc.

The bottom row of key labels are for the numerals 1 through 0 on the top row of a standard keyboard. Number 1 provides a busy position indication, which would appear on the call status column and prevents calls from being sent to this position when, for example, the operator takes a break. Numbers 4 through 7 manipulate ALI information. Button 7 provides for up to the last 10 ALIs to be displayed. Button 8 provides for calling back the originator of the latest 911 call, and button 0 provides outgoing call capabilities from the 911 operator position.

It is to be understood that the above-described embodiments are merely illustrative principles of the invention and that many variations may be devised by those skilled in the art, without departing from the scope of the invention. For example, one skilled in the art could use the illustrated ISDN embodiment to develop an analog line-based PSAP that can provide CPN to the operator position. It is, therefore, intended that such variations be included within the scope of the claims.

We claim:

1. A system for delivering emergency information from a telephone to an operator station in a public safety answering point (PSAP) through a public telephone network in response to an emergency number entered at said telephone, said telephone having an automatic number identification (ANI) defining a billing number of said telephone and a calling party number (CPN) defining a directory number of said telephone, said system comprising:
   a switch in said public telephone network which terminates a connection to said operator station, said switch including a plurality of termination ports;
   a line directly connecting said operator station to one of said plurality of termination ports of said switch, said line providing a voice path and a separate data path between said operator station and said switch, which line is exclusively used by said operator station;
   means at said switch for transmitting on said separate data path said CPN of said telephone to said operator station;
   means connected to said telephone network for storing location information of said telephone in accordance with its CPN; and
   means at said operator station for obtaining and displaying said location information of said telephone.

2. A system according to claim 1 wherein said means at said operator station for displaying said location information comprises a computer.

3. A system according to claim 1 wherein said line comprises an integrated services digital network (ISDN) line.

4. A system according to claim 1 further comprising:
   means in said system for determining whether delivery of said CPN is blocked, and unblocking delivery of said CPN responsive to determining that said CPN delivery is blocked.

5. A system according to claim 1 further including:
   means for determining whether said CPN is a valid number, and sending said automatic number identification (ANI) information in place of said CPN responsive to determining that said CPN is not valid.

6. A system according to claim 1 further including:
   means for transferring said information from said operator station to another operator station including inserting said CPN as a call origination number.

7. A system according to claim 1 further including:
   a plurality of operator stations at said PSAP connected via lines to said switch which said switch accesses as a multi-line hunt group; and
   means for queuing an incoming call if none of the lines of said multi-line hunt group are available, and causing an indication of said queued calls to appear at said PSAP.

8. A system according to claim 7 further including:
   means for providing a busy indication for each of the lines in said multi-line hunt group to said operator station; and
   means for displaying an active/busy status at said PSAP.

9. A system according to claim 1 further including:
   means for storing and retrieving a plurality of previously displayed CPNs and each CPN's associated location information.

10. A system according to claim 1 wherein said telephone's CPN comprises a different number from its ANI.

11. A system according to claim 1 wherein said means for storing location information comprises an automatic location information (ALI) system physically outside of said PSAP and access thereto is transmitted through said public telephone network, said system further comprising:
    means for transmitting said CPN from said operator station via said separate data path to said switch;
    means at said switch for delivering said CPN to said ALI system through said switch and receiving from said ALI system said location information; and
    means for transmitting said location information from said switch to said operator station.

12. A method of providing emergency telephone service in a public telephone network, said telephone network comprising telephone switching systems, each having a plurality of telephones connected thereto, each of said telephones having an automatic number identification (ANI) defining a billing number and a calling party number (CPN) defining a directory number, and at least one public safety answering point (PSAP) connected to a selected one of said switching systems, said PSAP having a multiplicity of operator stations connected to said selected one of said switching systems by a corresponding multiplicity of lines, each of said lines providing a voice path and a separate data path between its operator station and said selected one of said switching systems said method comprising:
    one of said switching systems receiving an emergency call from one of said plurality of telephones connected thereto;
    said one of said switching systems routing said emergency call to said selected one of said switching systems connected to said PSAP;

transmitting said CPN of said one of said plurality of telephones to said selected one of said switching systems delivering said CPN of said one of said plurality of telephones to one of said multiplicity of operator stations over said data path of one of said lines between said one of said multiplicity of operator stations and said selected one of said switching systems said one of said multiplicity of operator stations retrieving location information associated with said one of said plurality of telephones based on said delivered CPN; and displaying said location information at said one of said multiplicity of operator stations.

13. A method according to claim 12 further including determining whether delivery of said CPN is blocked; and unblocking said CPN delivery if said CPN delivery is blocked.

14. A method according to claim 12 further including determining whether said CPN is valid for said one of said plurality of telephones and delivering said automatic number identification (ANI) information in place of said CPN if said CPN is not valid.

15. A method according to claim 12 further including transferring said emergency call from said one of said multiplicity of operator stations to another PSAP including inserting said CPN of said one of said plurality of telephones in place of a CPN of said one of said multiplicity of operator stations in said transfer.

16. A method according to claim 12 wherein said step of retrieving location information associated with said one of said plurality of telephones based on said delivered CPN comprises:

originating a data call over said data path through said selected one of said switching systems and said public telephone network to an automatic location information (ALI) system;

sending an inquiry message including said CPN via said data call to said ALI system;

said ALI system determining the location of said one of said plurality of telephones base upon said CPN; and said ALI system sending a response message including said location information via said data call and said data path to said one of said multiplicity of operator stations.

17. A method according to claim 16 further including said ALI system retrieving other information regarding said one of said plurality of telephones based on said delivered CPN and said location information.

* * * * *